(12) United States Patent
Chang et al.

(10) Patent No.: US 9,226,392 B2
(45) Date of Patent: Dec. 29, 2015

(54) TAMPER PROTECTION DEVICE AND DATA TRANSACTION APPARATUS

(71) Applicant: XAC AUTOMATION CORP., Hsinchu (TW)

(72) Inventors: Yeng Ming Chang, New Taipei (TW); Carl Wesley Robinson, Charlotte, NC (US); Li De Chen, Nantou County (TW)

(73) Assignee: XAC AUTOMATION CORP., Hsin-Chu (TW)

( * ) Notice: Subject to any disclaimer, the term of this patent is extended or adjusted under 35 U.S.C. 154(b) by 246 days.

(21) Appl. No.: 13/745,040

(22) Filed: Jan. 18, 2013

(65) Prior Publication Data

US 2014/0204543 A1    Jul. 24, 2014

(51) Int. Cl.
| | |
|---|---|
| H05K 1/00 | (2006.01) |
| H05K 1/02 | (2006.01) |
| H05K 5/02 | (2006.01) |
| G06F 21/86 | (2013.01) |
| H05K 1/14 | (2006.01) |

(52) U.S. Cl.
CPC ............. *H05K 1/0275* (2013.01); *G06F 21/86* (2013.01); *H05K 5/0208* (2013.01); *G06F 2221/2101* (2013.01); *H05K 1/144* (2013.01); *H05K 1/147* (2013.01); *H05K 2201/09263* (2013.01); *H05K 2201/2018* (2013.01)

(58) Field of Classification Search
CPC ..... H05K 1/118; H05K 1/189; H05K 1/0275; G06F 21/70
USPC ................. 361/749, 750, 760–765, 792, 818; 174/250, 260–262
See application file for complete search history.

(56) References Cited

U.S. PATENT DOCUMENTS

| | | | | | |
|---|---|---|---|---|---|
| 4,649,833 | A | * | 3/1987 | Cummins | 109/25 |
| 4,807,284 | A | * | 2/1989 | Kleijne | 713/194 |
| 6,970,351 | B2 | * | 11/2005 | Perez et al. | 361/679.57 |
| 7,306,689 | B2 | * | 12/2007 | Okubora et al. | 156/239 |
| 7,825,801 | B2 | * | 11/2010 | Woods | 340/547 |
| 7,915,540 | B2 | * | 3/2011 | Oggioni | 174/261 |
| 7,936,266 | B2 | * | 5/2011 | Francis et al. | 340/545.1 |
| 8,077,039 | B2 | * | 12/2011 | Brumer et al. | 340/572.1 |
| 2005/0161253 | A1 | * | 7/2005 | Heitmann et al. | 174/261 |
| 2007/0256850 | A1 | * | 11/2007 | Hansen | 174/66 |
| 2010/0251544 | A1 | * | 10/2010 | Chou | 29/846 |
| 2011/0090658 | A1 | * | 4/2011 | Adams et al. | 361/765 |
| 2011/0240732 | A1 | * | 10/2011 | Deng | 235/375 |
| 2011/0255253 | A1 | * | 10/2011 | Campbell et al. | 361/752 |

FOREIGN PATENT DOCUMENTS

| | | | | |
|---|---|---|---|---|
| CN | 200944121 | Y | * | 9/2007 |
| GB | 002483894 | A | * | 3/2012 |

OTHER PUBLICATIONS (Machine Translation of CN200944121Y) Zhang, Electric Meter Box.*

* cited by examiner

*Primary Examiner* — Yuriy Semenenko

(74) *Attorney, Agent, or Firm* — WPAT, P.C.; Anthony King

(57) ABSTRACT

A data transaction apparatus includes a housing, a system circuit board comprising a tamper detection circuit disposed in the housing, and a tamper protection device configured to seal the system circuit board within the housing in a detachable manner. The tamper protection device includes a tamper resistant board and a resin layer covering the tamper resistant board, wherein the tamper resistant board includes a flexible substrate and a plurality of fence-like lead wires disposed on the flexible substrate. In one embodiment of the present disclosure, the tamper detection circuit is triggered to generate a secure response when a tamper event is detected.

13 Claims, 5 Drawing Sheets

TAMPER PROTECTION DEVICE AND DATA TRANSACTION APPARATUS

BACKGROUND

1. Technical Field

The present disclosure relates to a tamper protection device and data transaction apparatus, and more particularly, to a tamper protection device and data transaction apparatus with a detachable tamper protection device.

2. Description of Related Arts

Data transaction apparatuses such as Point of Sale (POS) terminals of the type typically used by merchants can permit holders of charge cards, credit cards, debit cards, and the like to make electronic payments for services and merchandise quickly and easily. With the advent of stored value cards and other smart card schemes, the use of POS terminals in some form is likely to increase dramatically over the next few decades. Indeed, as the feature set of POS terminals and associated peripheral devices such as PIN entry devices/terminals increase, the use of POS terminals may largely supplant or even replace the use of cash and checks in many contexts.

All transactions that require the entry of a PIN necessitate that the PIN itself and any data associated with the PIN must be secure and remain secure. As such, PIN entry devices utilize encryption in the form of keys to establish the necessary security function. Additionally, PIN entry devices are designed to be tamper resistant security modules.

In order to provide a tamper resistant security module, PIN entry devices are sealed. If and when a PIN entry device is opened, all of the secure data is erased. Accordingly, a security system for electronic circuits contained within a secure POS terminal has been disclosed in the art. The conventional POS terminal comprises a display, a system board, and a security fence module which seals the system board by glue, wherein a tamper detection circuit (not shown) is provided on the system board.

If the security fence module is penetrated, a security response is triggered, deleting any confidential information contained within the security POS terminal. When the system board is disconnected from the security fence module and the security fence module is interrupted, the tamper detection circuit is promptly triggered.

However, the POS terminal is not allowed to undergo repair or modification because the security fence module seals the system board with glue. If one part of the POS terminal fails, there is no alternative but to discard the failed POS terminal as a whole.

SUMMARY

One aspect of the present disclosure provides a tamper protection device and data transaction apparatus with a detachable tamper protection device.

A tamper protection device according to this aspect of the present disclosure comprises a tamper resistant board and a resin layer covering the tamper resistant board, wherein the tamper resistant board comprises a flexible substrate and a plurality of fence-like lead wires disposed on the flexible substrate.

A data transaction apparatus according to another aspect of the present disclosure comprises a housing, a system circuit board comprising a tamper detection circuit disposed in the housing, and a tamper protection device configured to seal the system circuit board within the housing in a detachable manner. In one embodiment of the present disclosure, the tamper protection device comprises a tamper resistant board and a resin layer covering the tamper resistant board, wherein the tamper resistant board comprises a flexible substrate and a plurality of fence-like lead wires disposed on the flexible substrate. In one embodiment of the present disclosure, the tamper detection circuit is triggered to generate a secure response when a tamper event is detected.

According to the prior art, the data transaction apparatus is not allowed to undergo repair or modification because the security fence module seals the system board by glue. If one part of the data transaction apparatus fails, there is no alternative but to discard the failed data transaction apparatus as a whole. In contrast, the present tamper protection device is configured to seal the system circuit board within the housing in a detachable manner such that the data transaction apparatus is allowed to undergo repair or modification.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another to embodiment.

References to "one embodiment," "an embodiment," "exemplary embodiment," "other embodiments," "another embodiment," etc. indicate that the embodiment(s) of the disclosure so described may comprise a particular feature, structure, or characteristic, but not every embodiment necessarily comprises the particular feature, structure, or characteristic. Further, repeated use of the phrase "in the embodiment" does not necessarily refer to the same embodiment, although it may.

The present disclosure is directed to a tamper protection device and data transaction apparatus with a detachable tamper protection device. In order to make the present disclosure completely comprehensible, detailed steps and structures are provided in the following description. Implementation of the present disclosure does not limit special details known by persons skilled in the art. In addition, known structures and steps are not described in detail, so as not to limit the present disclosure unnecessarily and preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
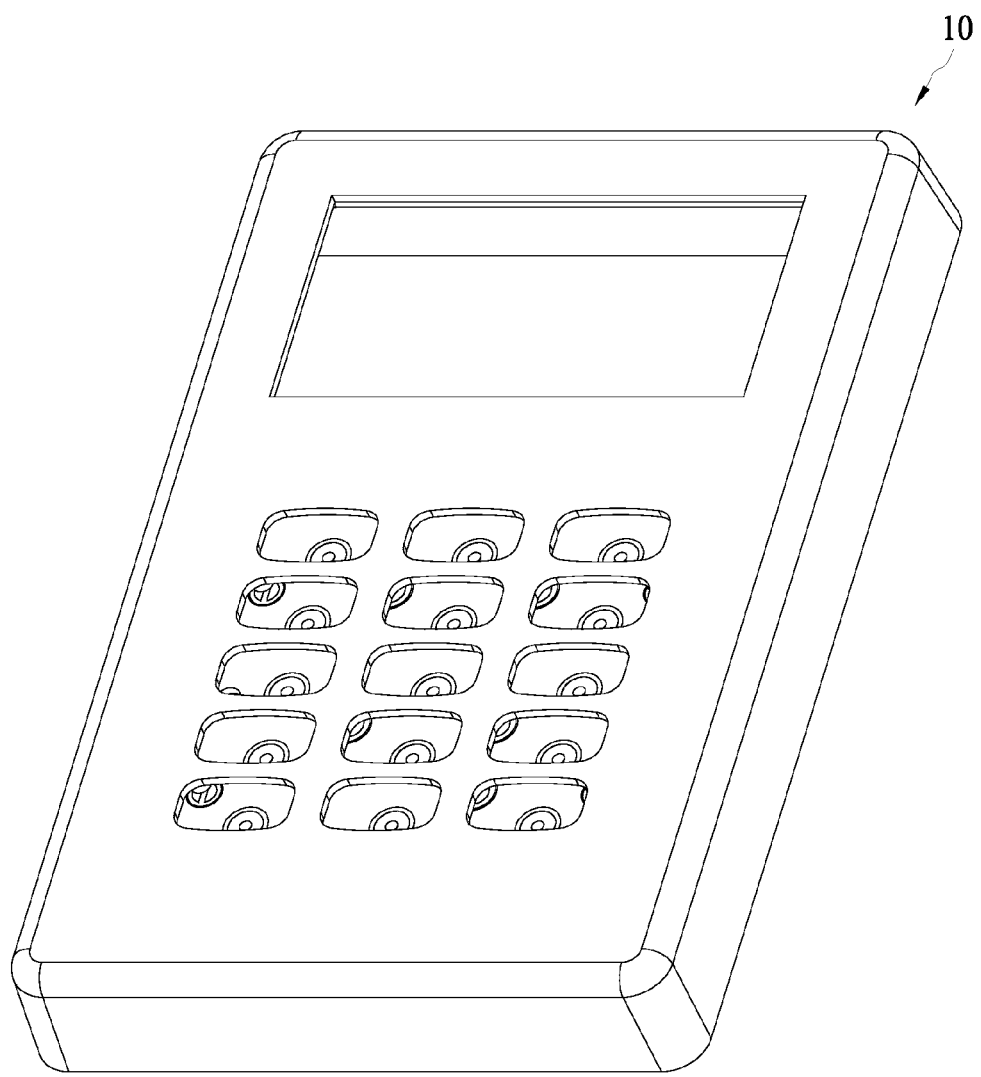
FIG. 1 and FIG. 2 illustrate assembled views of a data transaction apparatus according to one embodiment of the present disclosure.
Figure 2:
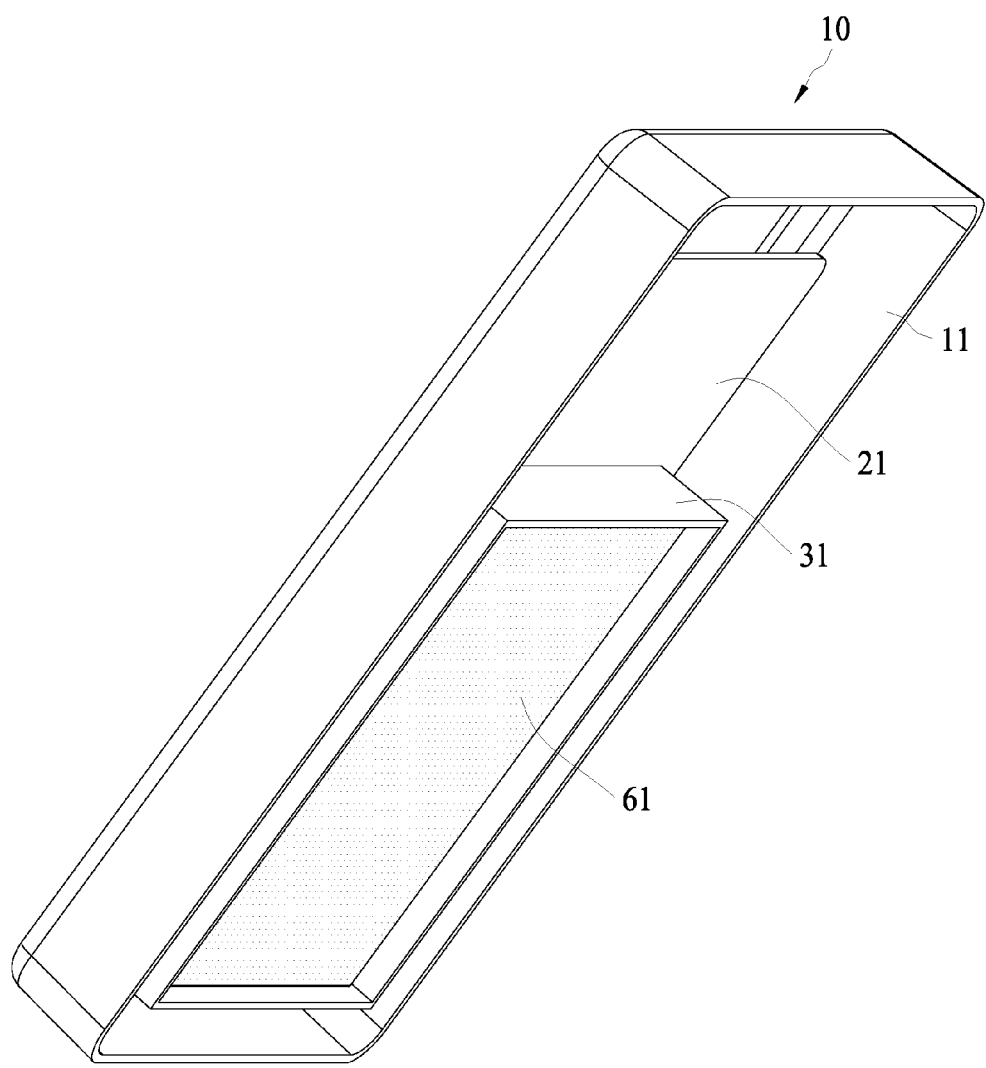
Figure 3:
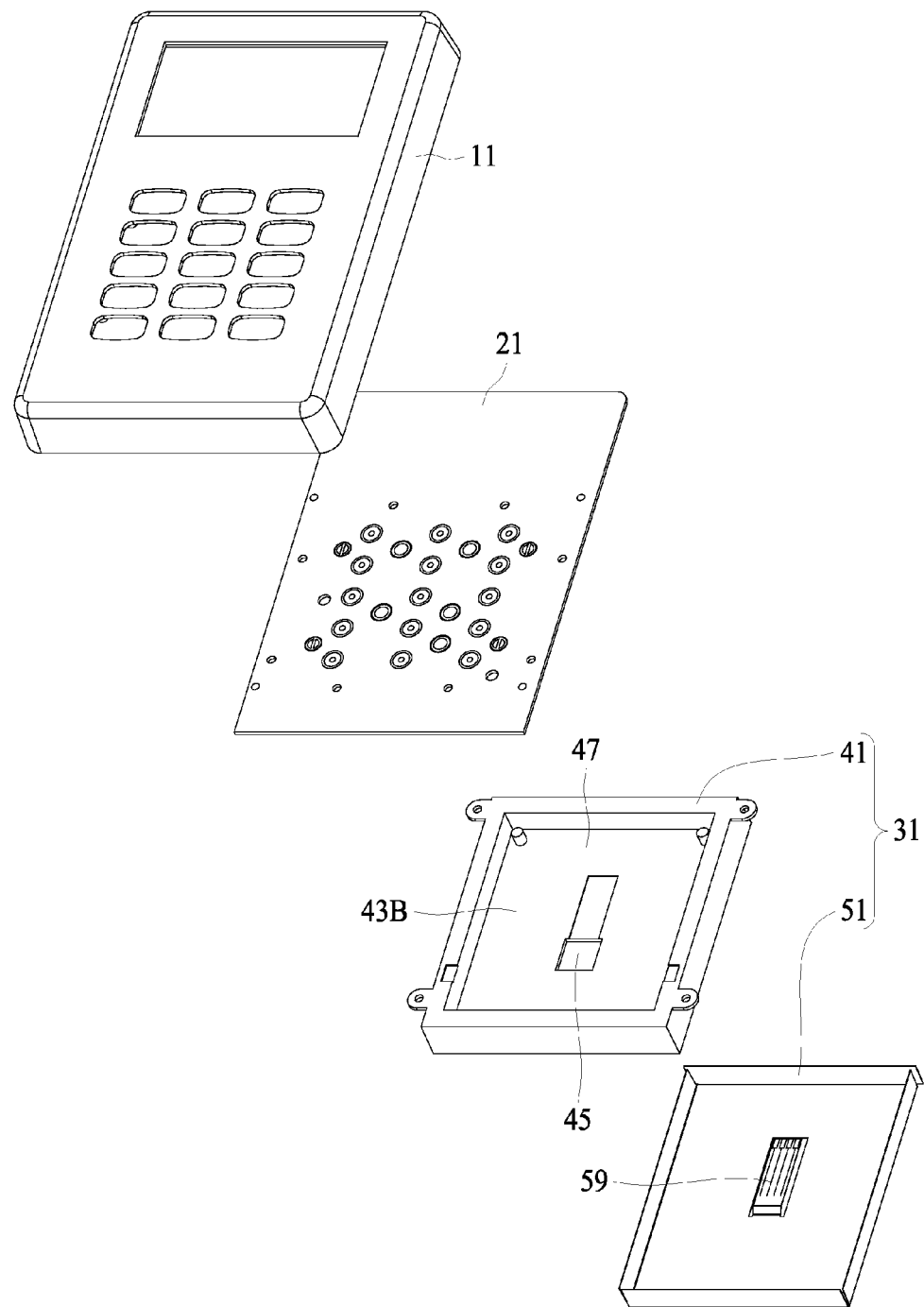
FIG. 3 and FIG. 4 illustrate exploded views of the data transaction apparatus according to one embodiment of the present disclosure.
Figure 4:
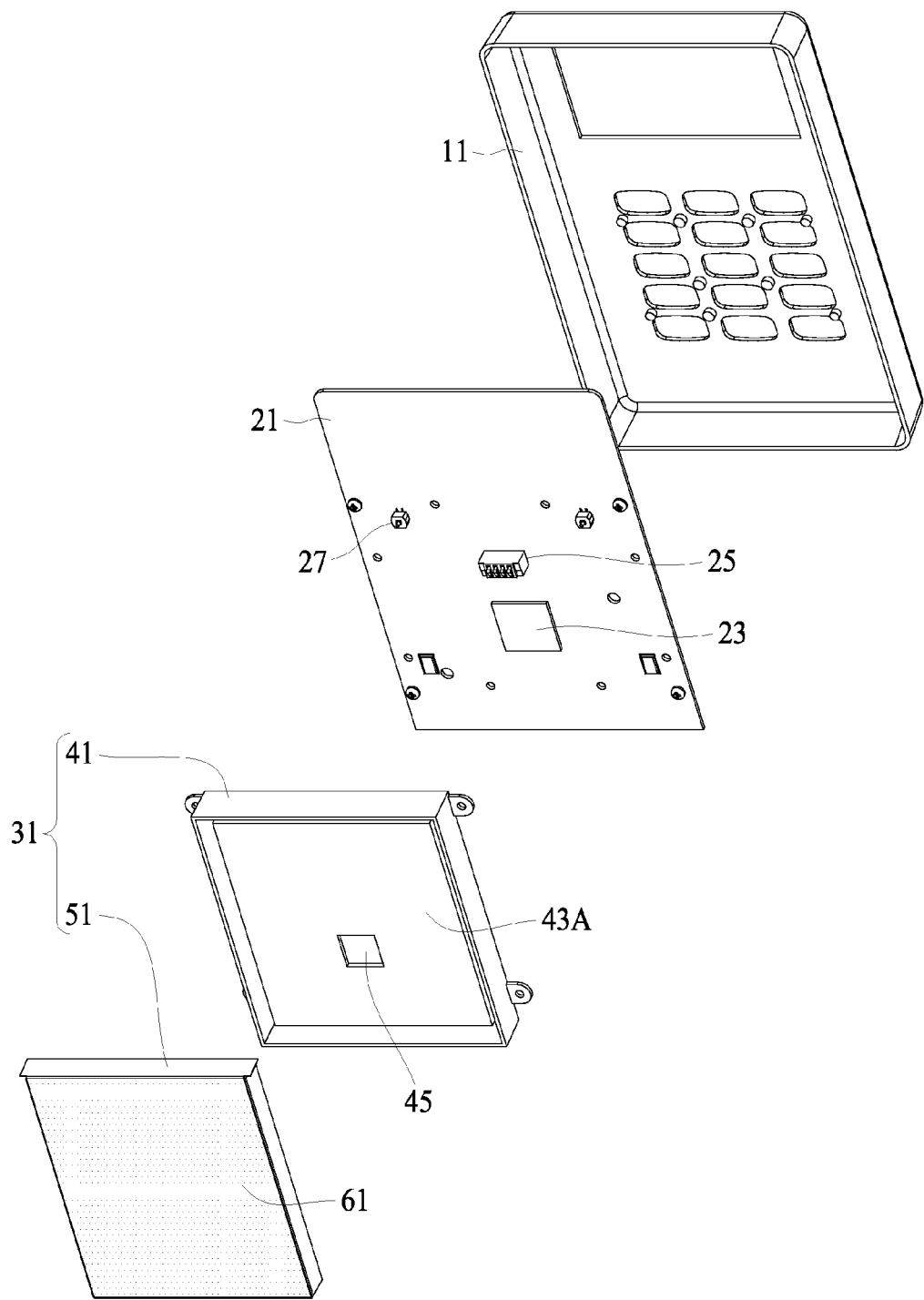

FIG. 1 and FIG. 2 illustrate assembled views of a data transaction apparatus 10 according to one embodiment of the present disclosure, and FIG. 3 and FIG. 4 illustrate exploded views of the data transaction apparatus 10 according to one embodiment of the present disclosure. In one embodiment of the present disclosure, the data transaction apparatus 10 comprises a housing 11, a system circuit board 21 comprising a tamper detection circuit 23 disposed in the housing 11, and a tamper protection device 31 configured to seal the system circuit board 21 within the housing 11 in a detachable manner.

In one embodiment of the present disclosure, the tamper protection device 31 comprises a rigid cover 41 having a first surface 43A and a second surface 43B opposite to the first surface 43A, a tamper resistant board 51 disposed on the rigid cover 41, and a resin layer 61 covering the tamper resistant board 51. In one embodiment of the present disclosure, the tamper resistant board 51 substantially covers the first surface 43A of the rigid cover 41, and the resin layer 61 comprises an epoxy resin. In another embodiment of the present disclosure, the tamper protection device 31 may comprise the tamper resistant board 51 and the resin layer 61, without the rigid cover 41. The rigid cover 41 functions as a temporary carrier during the molding process of the tamper protection device 31, and this carrier function can be implemented by the mold during the molding process.

Figure 5:
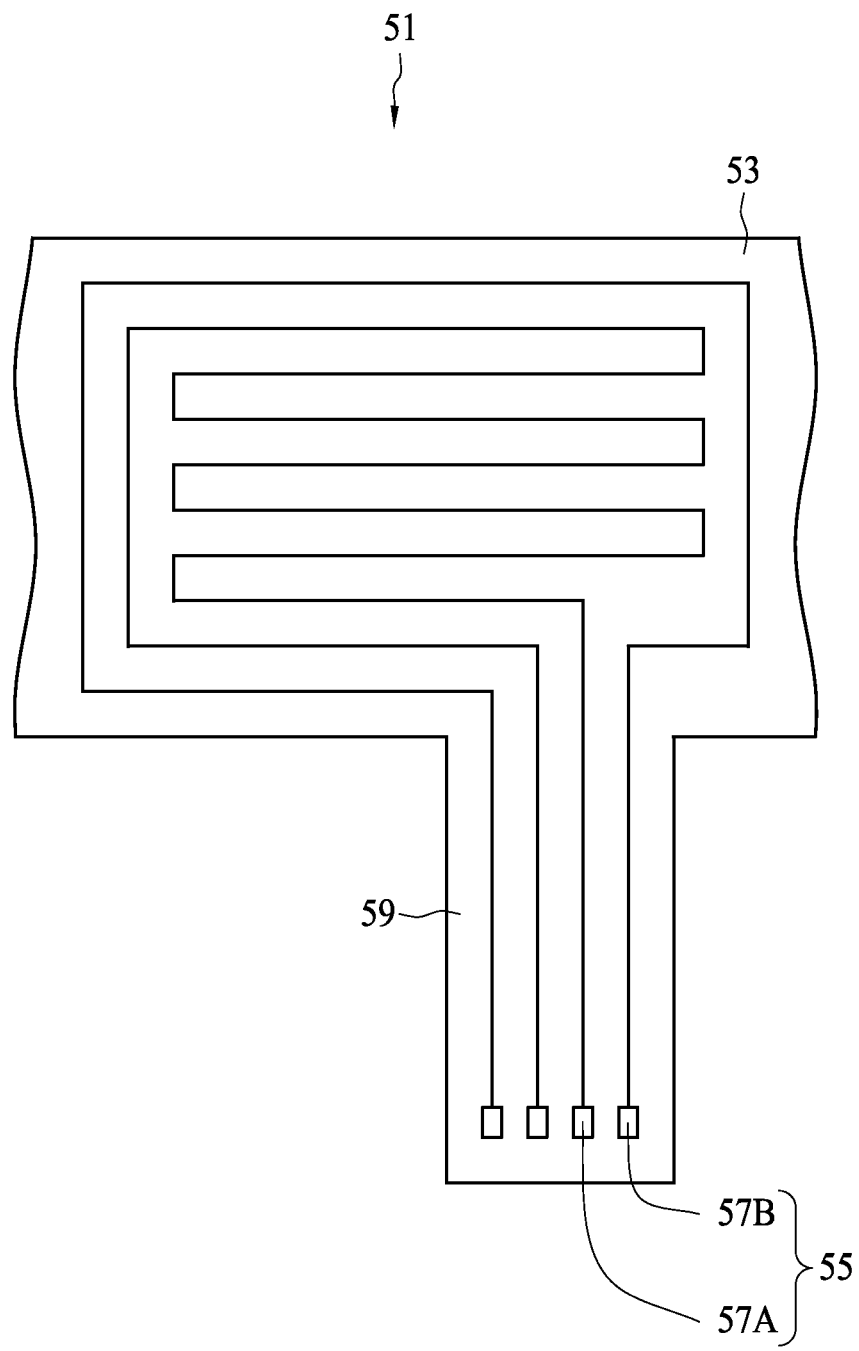
FIG. 5 is a schematic view of the tamper resistant board according to one embodiment of the present disclosure.

FIG. 5 is a schematic view of the tamper resistant board 51 according to one embodiment of the present disclosure. In one embodiment of the present disclosure, the tamper resistant board 51 comprises a flexible substrate 53 and a plurality of fence-like lead wires 55 disposed on the flexible substrate 53. In one embodiment of the present disclosure, the flexible substrate 53 comprises polyethylene terephthalate and the plurality of fence-like lead wires 55 comprises silver. In one embodiment of the present disclosure, the plurality of fence-like lead wires 55 comprises a first loop 57A, and a second loop 57B substantially surrounding the first loop 57A. The second loon 57B and the first loon 57A are configured as electrically disconnected from each other.

Referring back to FIG. 3 and FIG. 4, the system circuit board 21 comprises a connector 25 and at least one tamper switch 27 disposed on one surface facing the tamper protection device 31; in addition, the rigid cover 41 comprises an aperture 45 connecting the first surface 43A with the second surface 43B, and the tamper resistant board 51 comprises a connecting terminal 59 extending to the second surface 43B through the aperture 45. As the tamper protection device 31 is assembled with the system circuit board 21, the connecting terminal 59 of the tamper resistant board 51 forms an electrical connection with the connector 25, and the tamper detection circuit 23, the connector 25 and the at least one tamper switch 27 are retained inside a depression 47 of the rigid cover 41.

Before the tamper protection device 31 is assembled with the system circuit board 21, the four contacts of the connector 25 are in a first state, for example, in a released state; after the tamper protection device 31 is assembled with the system circuit board 21, the four contacts of the connector 25 are in a second state, for example, in a pressed state. In other words, when the system circuit board 21 is moved away from the tamper protection device 31, the four contacts of the connector 25 transform from the second state to the first state.

As the connecting terminal 59 of the tamper resistant board 51 forms the electrical connection with the connector 25, the four contacts of the connector 25 are pressed by the connecting terminal 59, i.e., in the second state, and the tamper detection circuit 23 is enabled. In one embodiment of the present disclosure, the tamper detection circuit 23 generates a secure response when a tamper event is detected, and the tamper event can be the transformation of the four contacts of the connector 25 from the second state to the first state.

Similarly, before the tamper protection device 31 is assembled with the system circuit board 21, the at least one tamper switch 27 is in a first state, for example, in a released state; after the tamper protection device 31 is assembled with the system circuit board 21, the at least one tamper switch 27 is in a second state, for example, in a pressed state. In other words, when the system circuit board 21 is moved away from the tamper protection device 31, the at least one tamper switch 27 transforms from the second state to the first state.

As the tamper protection device 31 is assembled with the system circuit board 21, the at least one tamper switch 27 is pressed by the tamper protection device 31, i.e., in the second state, and the tamper detection circuit 23 is enabled. In one embodiment of the present disclosure, the tamper detection circuit 23 generates a secure response when a tamper event is detected, and the tamper event can be the transformation of at least one tamper switch 27 from the second state to the first state.

Referring back to FIG. 5, as the tamper protection device 31 is assembled with the system circuit board 21, the first loop 57A and the second loop 57B are biased to different voltages; for example, the first loop 57A is biased to the ground, while the second loop 57B is biased to a positive voltage. Consequently, when an intruder drills into the tamper protection device 31, at least one of the first loop 57A and the second loop 57B brakes to form an open circuit. Accordingly, in response to the open circuit, the tamper detection circuit 23 generates a secure response.

According to the prior art, the data transaction apparatus is not allowed to undergo repair or modification because the security fence module seals the system board by glue. If one part of the data transaction apparatus fails, there is no alternative but to discard the failed data transaction apparatus as a whole. In contrast, the present tamper protection device 31 is configured to seal the system circuit board 21 within the housing 11 in a detachable manner such that the data transaction apparatus 10 is allowed to undergo repair or modification.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to comprise within their scope such processes, machines, manufacture, compositions of matter, means, methods, or steps.

What is claimed is:

1. A tamper protection device, comprising:
   a tamper resistant board comprising a flexible substrate and a plurality of fence-like lead wires disposed on the flexible substrate, and a connecting terminal;
   a resin layer covering the tamper resistant board; and
   a rigid cover comprising a first surface, a second surface opposite to the first surface, and an aperture connecting the first surface with the second surface;
   wherein the plurality of fence-like lead wires comprises a first loop and a second loop substantially surrounding the first loop, and the first loop and the second loop are electrically disconnected from each other, and the connecting terminal extends to the second surface through the aperture.

2. The tamper protection device of claim 1, wherein the tamper resistant board is disposed on the rigid cover.

3. The tamper protection device of claim 2, wherein the tamper resistant board substantially covers the first surface.

4. The tamper protection device of claim 1, wherein the resin layer comprises an epoxy resin.

5. The tamper protection device of claim 1, wherein the flexible substrate comprises polyethylene terephthalate.

6. The tamper protection device of claim 1, wherein the plurality of fence-like lead wires comprises silver.

7. A data transaction apparatus, comprising:
   a housing;
   a system circuit board comprising a tamper detection circuit disposed in the housing; and
   a tamper protection device configured to seal the system circuit board within the housing in a detachable manner, wherein the tamper protection device comprises:
   a tamper resistant board comprising a flexible substrate, a plurality of fence-like lead wires disposed on the flexible substrate, and a connecting terminal;
   a resin layer covering the tamper resistant board; and
   a rigid cover comprising a first surface, a second surface opposite to the first surface, and an aperture connecting the first surface with the second surface;
   wherein the tamper detection circuit is triggered to generate a secure response when a tamper event is detected;
   wherein the plurality of fence-like lead wires comprises a first loop and a second loop substantially surrounding the first loop, and the first loop and the second loop are electrically disconnected from each other, and the connecting terminal extends to the second surface through the aperture.

8. The data transaction apparatus of claim 7, wherein the tamper resistant board is disposed on the rigid cover.

9. The data transaction apparatus of claim 7, wherein the resin layer comprises an epoxy resin.

10. The data transaction apparatus of claim 7, wherein the flexible substrate comprises polyethylene terephthalate.

11. The data transaction apparatus of claim 7, wherein the plurality of fence-like lead wires comprises silver.

12. The data transaction apparatus of claim 7, wherein the system circuit board comprises a connector, and the tamper resistant board comprises a connecting terminal configured to form an electrical connection with the connector.

13. The data transaction apparatus of claim 7, wherein the system circuit board comprises at least one tamper switch disposed on one surface facing the tamper protection device.

* * * * *